(12) United States Patent
Brown

(10) Patent No.: US 11,274,577 B2
(45) Date of Patent: Mar. 15, 2022

(54) VARIABLE CAMSHAFT TIMING ASSEMBLY

(71) Applicant: BorgWarner, Inc., Auburn Hills, MI (US)

(72) Inventor: Daniel Brown, Freeville, NY (US)

(73) Assignee: BORGWARNER, INC., Auburn Hills, MI (US)

(*) Notice: Subject to any disclaimer, the term of this patent is extended or adjusted under 35 U.S.C. 154(b) by 89 days.

(21) Appl. No.: 16/676,973

(22) Filed: Nov. 7, 2019

(65) Prior Publication Data

US 2020/0149439 A1     May 14, 2020

Related U.S. Application Data

(60) Provisional application No. 62/757,235, filed on Nov. 8, 2018.

(51) Int. Cl.
| | |
|---|---|
| *F01L 1/352* | (2006.01) |
| *F16H 53/04* | (2006.01) |
| *F16H 1/32* | (2006.01) |
| *F01L 1/344* | (2006.01) |
| *F01L 1/047* | (2006.01) |

(52) U.S. Cl.
CPC .............. *F01L 1/352* (2013.01); *F01L 1/3442* (2013.01); *F16H 1/32* (2013.01); *F16H 53/04* (2013.01); *F01L 2001/0473* (2013.01); *F01L 2001/34486* (2013.01)

(58) Field of Classification Search
CPC ......... F01L 1/352; F01L 1/3442; F01L 1/344; F01L 2001/34486; F01L 2001/34496; F01L 2820/032; F01L 1/047; F01L 2001/0473; F01L 1/34413; F01L 2001/34493; F16H 1/32; F16H 1/22; F16H 1/00; F16H 53/04
USPC ................................ 123/90.16, 90.17, 90.15
See application file for complete search history.

(56) References Cited

U.S. PATENT DOCUMENTS

| | | | | |
|---|---|---|---|---|
| 2,079,009 A | * | 5/1937 | Gregg | F01L 1/344 464/3 |
| 3,516,394 A | * | 6/1970 | Nichols | F01L 1/34413 123/90.17 |
| 5,417,186 A | * | 5/1995 | Elrod | F01L 13/0057 123/90.17 |

(Continued)

FOREIGN PATENT DOCUMENTS

| | | | | |
|---|---|---|---|---|
| DE | 102010014249 A1 | * | 10/2011 | ......... F01L 13/0042 |
| EP | 3141711 A1 | * | 3/2017 | ............ F01L 1/3442 |

(Continued)

*Primary Examiner* — Patrick Hamo
*Assistant Examiner* — Wesley G Harris
(74) *Attorney, Agent, or Firm* — Reising Ethington P.C.

(57) ABSTRACT

A variable camshaft timing (VCT) assembly for controlling the angular position of concentric camshafts includes an independent VCT device that is configured to couple with a first concentric camshaft and change an angular position of the first concentric camshaft relative to an angular position of a crankshaft; and one or more dependent VCT devices mechanically linking an output of the independent VCT device with a second concentric camshaft, wherein the dependent VCT device(s) change(s) an angular position of the second concentric camshaft relative to the angular position of the first concentric camshaft based on angular movement of the output of the independent VCT device.

13 Claims, 10 Drawing Sheets

(56) References Cited

U.S. PATENT DOCUMENTS

| | | | |
|---|---|---|---|
| 6,253,719 B1 | 7/2001 | Methley | |
| 7,377,243 B2 * | 5/2008 | Meintschel | F01L 1/352 123/90.17 |
| 7,938,090 B2 | 5/2011 | Lancefield et al. | |
| 2009/0120388 A1 * | 5/2009 | Lee | F01L 1/352 123/90.11 |
| 2012/0227696 A1 * | 9/2012 | Gallmeyer | F02D 41/009 123/90.17 |
| 2014/0076252 A1 * | 3/2014 | Burke | F01L 1/352 123/90.17 |

FOREIGN PATENT DOCUMENTS

| | | | |
|---|---|---|---|
| EP | 3141711 A1 | 3/2017 | |
| GB | 2401163 A | 11/2004 | |
| WO | WO-02101207 A1 * | 12/2002 | F01L 13/0057 |

\* cited by examiner

VARIABLE CAMSHAFT TIMING ASSEMBLY

CROSS-REFERENCE TO RELATED PATENT APPLICATIONS

This patent application claims the benefit of priority from U.S. Provisional Patent Application No. 62/757,235 filed Nov. 8, 2018, the entire contents of which are hereby incorporated by reference.

TECHNICAL FIELD

The present application relates to internal combustion engines (ICEs) and, more particularly, to variable camshaft timing (VCT) used with the ICEs.

BACKGROUND

Internal combustion engines (ICEs) use one or more camshafts to open and close intake and exhaust valves in response to cam lobes selectively actuating valve stems as the camshaft(s) rotate overcoming the force of valve springs that keep the valves seated and displacing the valves. The shape and angular position of the cam lobes can affect the operation of the ICE. In the past, the angular position of the camshaft relative to the angular position of the crankshaft was fixed. But it is possible to vary the angular position of the camshaft relative to the crankshaft using variable camshaft timing (VCT). VCT can be implemented using VCT devices (sometimes referred to as camshaft phasers) that change the angular position of the camshaft relative to the crankshaft. These camshaft phasers can be hydraulically- or electrically-actuated and are typically directly attached to one end of the camshaft.

Concentric camshafts including an inner camshaft and an outer camshaft can be used to vary the angular position of the inner camshaft relative to the crankshaft and the outer camshaft relative to the crankshaft. One VCT device can be coupled with one of the concentric camshafts (the inner camshaft or outer camshaft) to change the angular position of that camshaft relative to the crankshaft and another VCT device can be coupled with the other of the concentric camshafts to change the angular position of the other camshaft relative to the crankshaft. However, the use of two VCT devices that each independently controls the angular position of a camshaft relative to the crankshaft can increase the axial length of the VCT assembly. It would be helpful to reduce the axial length of the VCT assembly and decrease the cost and complexity of the VCT assembly.

SUMMARY

In one implementation, a variable camshaft timing (VCT) assembly for controlling the angular position of concentric camshafts includes an independent VCT device that is configured to couple with a first camshaft and change an angular position of the first camshaft relative to an angular position of a crankshaft; and one or more dependent VCT devices mechanically linking an output of the independent VCT device with a second camshaft, wherein the dependent VCT device(s) change(s) an angular position of the second camshaft relative to the angular position of the first camshaft based on angular movement of the output of the independent VCT device.

In another implementation, a variable camshaft timing (VCT) assembly for controlling the angular position of camshafts includes an independent VCT device having an output that is configured to couple with a first concentric camshaft and change an angular position of the first concentric camshaft relative to an angular position of a crankshaft; and one or more dependent VCT devices, mechanically linking an output of the independent VCT device with a second concentric camshaft, having a planetary gear that pivots relative to a housing about a planetary gear pivot and engages a ring gear coupled with the housing; a camshaft pivot coupled with the first concentric camshaft or an output of the independent VCT device; a link that movably couples the planetary gear pivot and the camshaft pivot, wherein the dependent VCT device(s) change(s) an angular position of the second concentric camshaft relative to the angular position of the first concentric camshaft based on angular movement of the output of the independent VCT device.

DETAILED DESCRIPTION

A variable camshaft timing (VCT) assembly comprises an independent VCT device and a dependent VCT device that control the angular position of first and second camshafts. In some implementations, the first and second camshafts can be concentric to each other. The independent VCT device receives rotational input from a crankshaft through an endless loop or geared timing drive. A first concentric camshaft is coupled to an output of the independent VCT device that changes the angular position of the first concentric camshaft relative to the crankshaft. Independent VCT devices can be implemented using electrically-actuated or hydraulically-actuated camshaft phasers. A dependent VCT device can link the output of the independent VCT with a second camshaft to change the angular position of the second camshaft relative to the first camshaft. The dependent VCT device can include a planetary gear carried by the output of the independent VCT device, a pivot on the face of the planetary gear, a pivot attached to the second concentric camshaft, and a link that pivotably connects the planetary gear pivot with and the second camshaft pivot. As the output of the independent VCT device angularly displaces the first concentric camshaft with respect to the crankshaft, the motion of the output also can simultaneously change the angular position of the second concentric camshaft with respect to the first concentric camshaft.

The angular position of the second concentric camshaft relative to the first concentric camshaft can be controlled by selecting motion variables attributed to the dependent VCT device. The motion variables include the polar coordinates of the planetary gear pivot on the face of the planetary gear, the polar coordinates of the second camshaft pivot, the length of the link, and the size of the planetary gear. Even the gear ratio between the planetary gear and the ring gear can be varied as a function of angular travel as is known in the design of non-round gears. The amount of relative angular movement between the first and second concentric camshafts, along with the rate at which the relative movement occurs, can be defined by the selection of these motion variables. The relative motion between the first and second concentric camshafts can be controlled more particularly by using a VCT assembly that includes one independent VCT device having an output linked to multiple dependent VCT devices. That is, the independent VCT device can have an output coupled to a first concentric camshaft, and a plurality of dependent VCT devices each coupled between the output and the second concentric camshaft. The additional dependent VCT devices can increase the transmittable torque between the first concentric camshaft and the second concentric camshaft.

Figure 1:
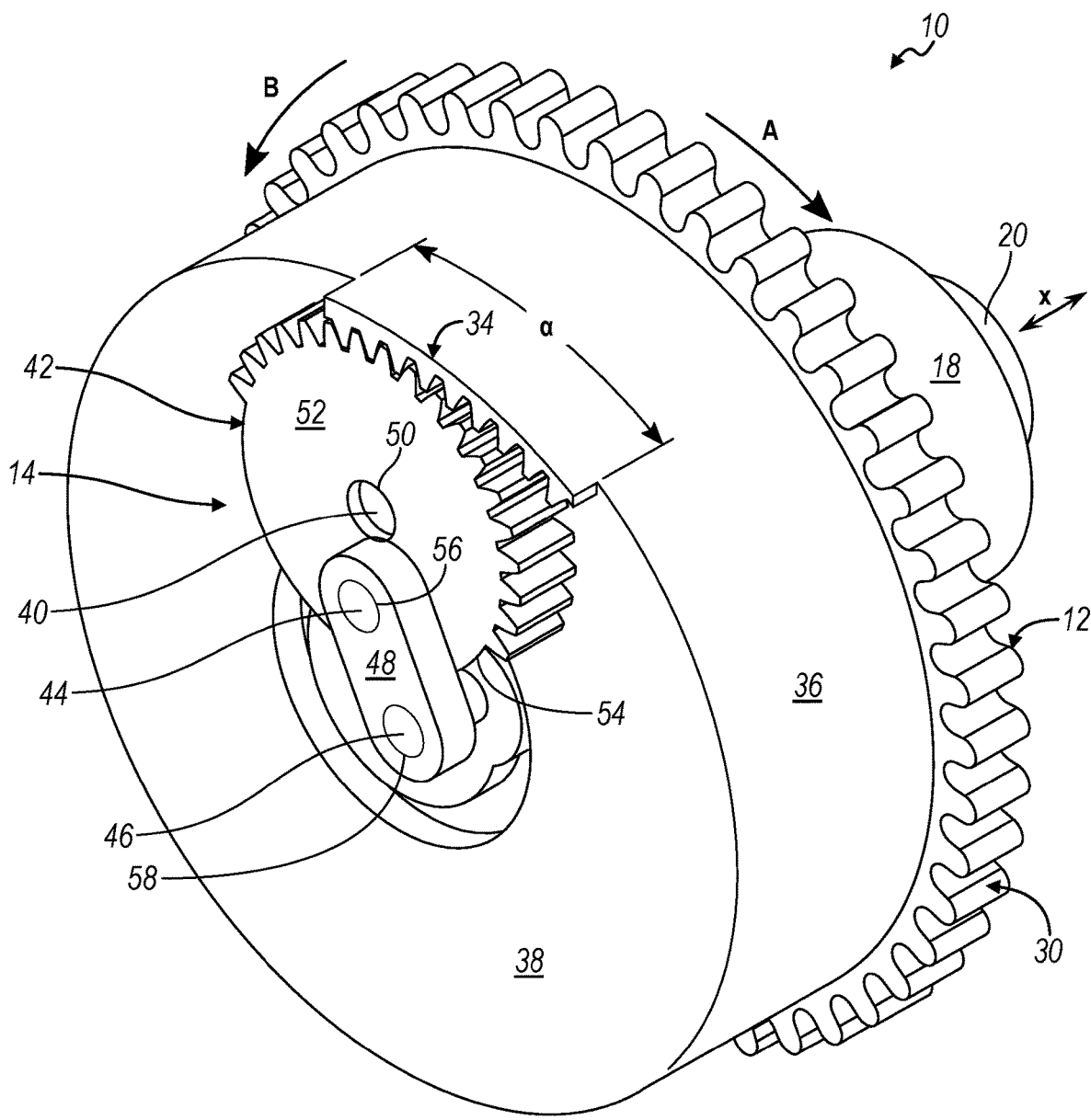
FIG. 1 is an isometric view depicting an implementation of a variable camshaft timing (VCT) assembly.

Internal combustion engines (ICEs) use reciprocating pistons linked to a crankshaft. The pistons move within cylinders in response to controlled combustion of air and fuel in the presence of spark in combustion chambers. The control of the combustion is at least partially regulated by opening and closing intake and exhaust valves using rotating camshafts. The camshafts rotate relative to the crankshaft and during rotation the cams open and close intake and exhaust valves at specified times relative to the delivery of spark to the combustion chambers of the cylinders. ICEs can implement multiple camshafts in different ways. For example, some ICEs use multiple camshafts, dedicating one camshaft for controlling the operation of intake valves and another camshaft for controlling the operation of exhaust valves. And in some implementations, the intake valve camshaft and the exhaust valve camshaft are concentrically positioned relative to each other. In other implementations, concentric camshafts may be used to actuate a portion of the intake (or exhaust) valves relative to the remainder of the intake (or exhaust) valves. Concentrically positioned camshafts include a first concentric camshaft and a second concentric camshaft that can change angular position relative to each other. Concentric camshafts are known by those skilled in the art, an example of which is shown in FIG. 1 of U.S. Pat. No. 8,186,319 and described in column 6, lines 10-53; the contents of that portion of U.S. Pat. No. 8,186,319 are incorporated by reference.

Figure 2:
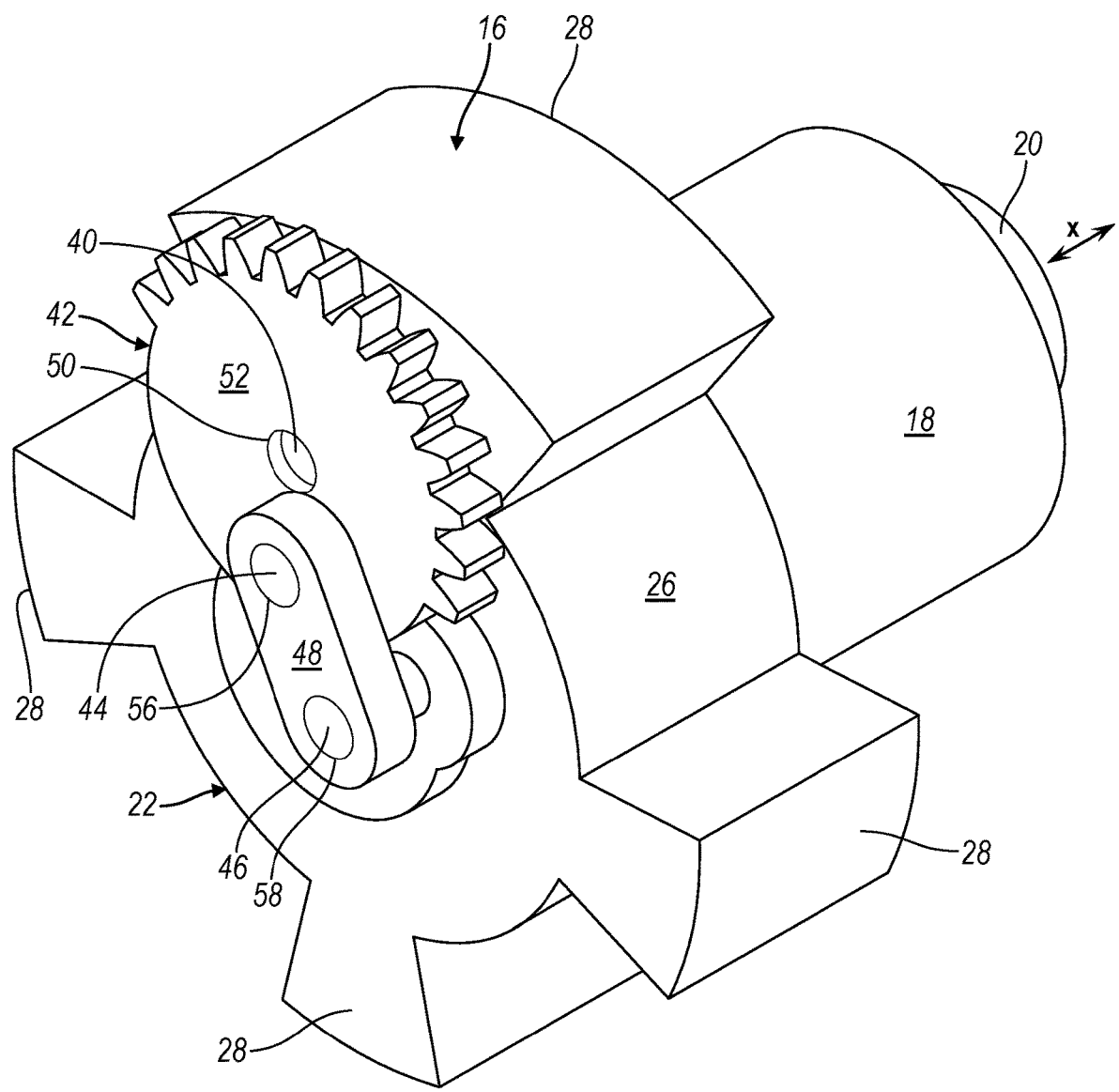
FIG. 2 is an isometric view depicting a portion of an implementation of a VCT assembly.
Figure 3:
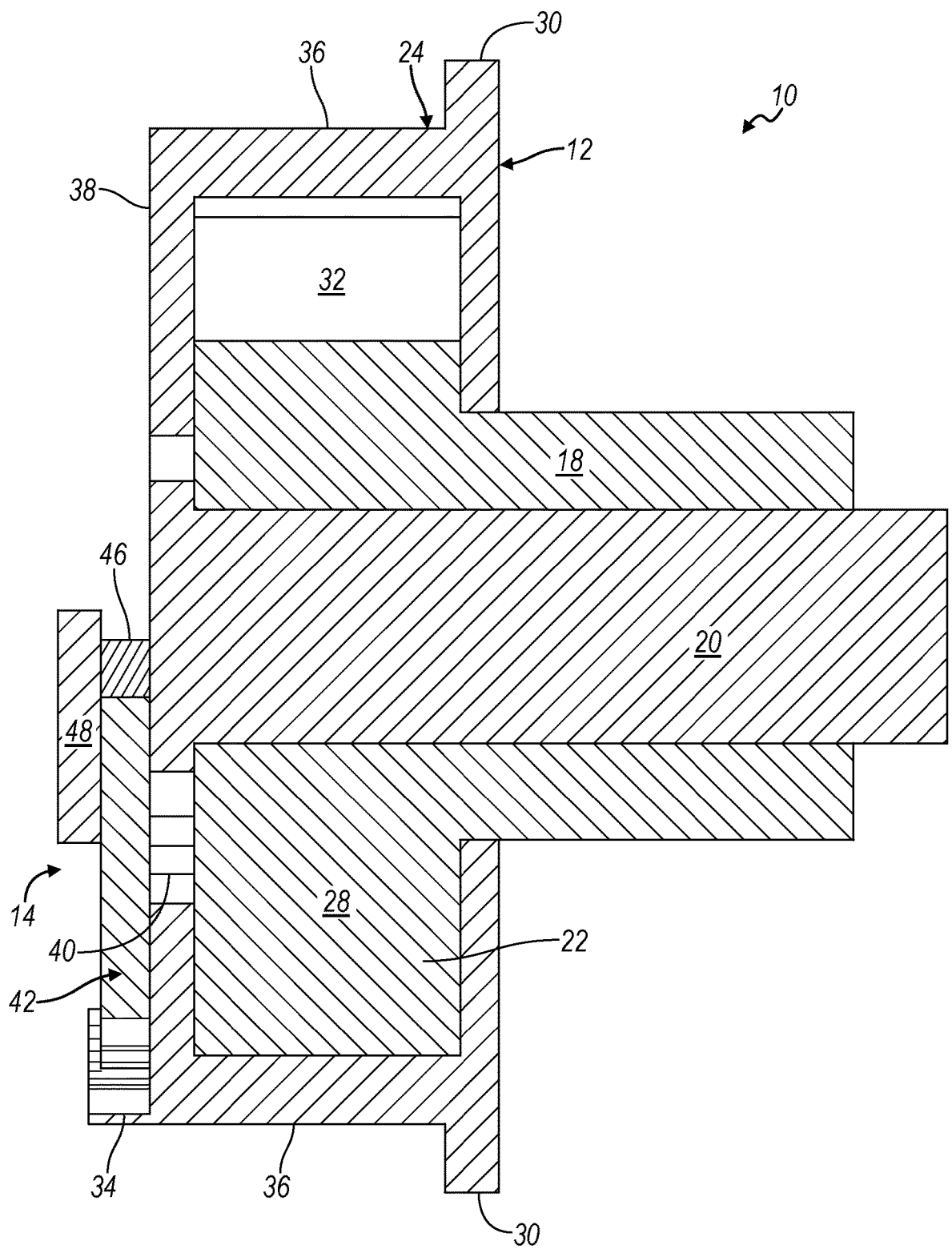
FIG. 3 is a cross-sectional view depicting an implementation of a VCT assembly.

Turning to FIGS. 1-3, an implementation of a VCT assembly 10 is shown. The VCT assembly includes an independent VCT device 12 and a dependent VCT device 14. The independent VCT device 12 has an output 16 that is coupled with an end of an outer concentric camshaft 18 and the dependent VCT device 14 mechanically links the output 16 of the independent VCT device 12 with an inner concentric camshaft 20. When the output 16 of the independent VCT device 12 moves the outer concentric camshaft 18 relative to the crankshaft so that the angular position of the outer concentric camshaft 18 changes relative to the angular position of the crankshaft, the motion of the output 16 also changes the angular position of the inner concentric camshaft 20 relative to the outer concentric camshaft 18. It should be understood that the example of inner concentric camshaft and outer concentric camshaft is provided by way of example. However, other implementations using the independent VCT device and the dependent VCT device are possible. For example, one or both of the inner and outer concentric camshafts could be replaced instead by non-concentric camshafts and an intermediate gear or sprocket may be used to actuate a camshaft not on the same axis as the VCT assembly.

The independent VCT device 12 in this implementation is a hydraulically-actuated camshaft phaser having a rotor 22 and a housing 24 (also referred to as a stator). The rotor 22 includes a generally annular hub 26 and one or more vanes 28 extending radially outwardly from the hub 26. In this implementation, the rotor 22 includes four vanes 28 and serves as the output 16 of the independent VCT device 12. The rotor 22 is rigidly coupled with the outer concentric camshaft 18 in a way that prevents rotational or radial displacement between the rotor 22 and the camshaft 18. The housing 24 can be generally cylindrically-shaped and have a camshaft sprocket 30, a plurality of fluid chambers 32 for receiving the vanes 28, and a ring gear 34. The camshaft sprocket 30 includes a plurality of radially-outwardly extending sprocket teeth that extend in an uninterrupted row along a radial surface 36 of the housing 24. The camshaft sprocket 30 engages an endless loop (not shown), such as a chain, which also engages a crankshaft sprocket (not shown) and translates the rotational force created by the crankshaft into rotational motion of the housing 24. As the crankshaft rotates during engine operation, the housing 24 correspondingly rotates as well. The ring gear 34 can include a plurality of radially-inwardly facing gear teeth and extend along an angular section (a) of the radial surface 36. The housing 24 can also include an axially-facing surface 38 that is substantially perpendicular to the radial surface 36. In other implementations, the ring gear 34 can be attached to the axially facing surface 38.

The dependent VCT device 14 includes a planetary gear 42, a pivot 44 extending from the face of the planetary gear, a camshaft pivot 46 extending from an end of the second concentric camshaft (camshaft pivot), and a link member 48 connecting the planetary gear pivot 44 and the camshaft pivot 46. The planetary gear 42 can include an annular opening 50 that extends between one axial face 52 of the planetary gear 42 and another axial face. The annular opening 50 is configured to receive the planetary gear shaft 40 allowing the planetary gear 42 to rotate about the planetary gear shaft 40. While the planetary gear 42 can be implemented in many different shapes and sizes, the gear 42 generally includes gear teeth that extend radially-outwardly away from the axis of planetary gear rotation and are positioned along at least a portion of a radial surface of the planetary gear 42. For example, the planetary gear 42 can be implemented as a sector gear in which only a portion of the circumference of the gear 42 includes gear teeth. For example, the planetary gear 42 can include gear teeth along ~30 degrees (d) of its radial surface 54. The planetary gear teeth can be configured to engage the gear teeth of the ring gear 34. The planetary gear pivot 44 can be configured to pivotably engage the link member 48 allowing the link member 48 to move about the pivot 44 and translate rotational motion of the planetary gear 42 into linear motion of the link member 48.

Figure 4A:
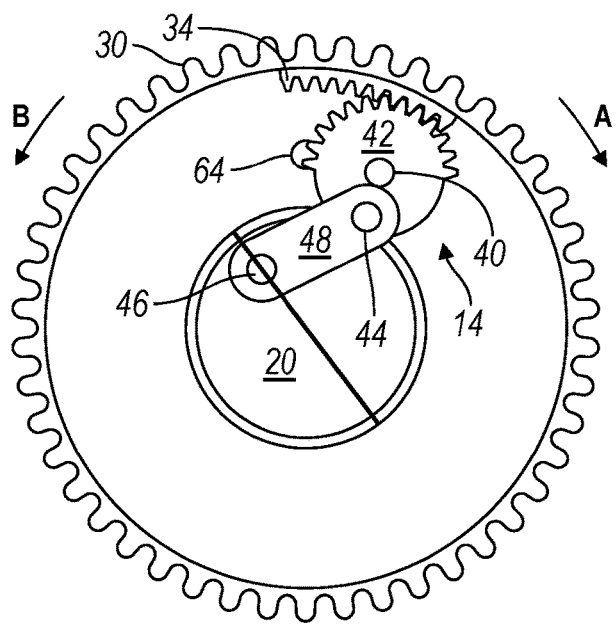
FIGS. 4*a*-4*c* are cross-sectional views depicting an implementation of a VCT assembly as a first concentric camshaft changes angular position relative to a second concentric camshaft.
Figure 4B:
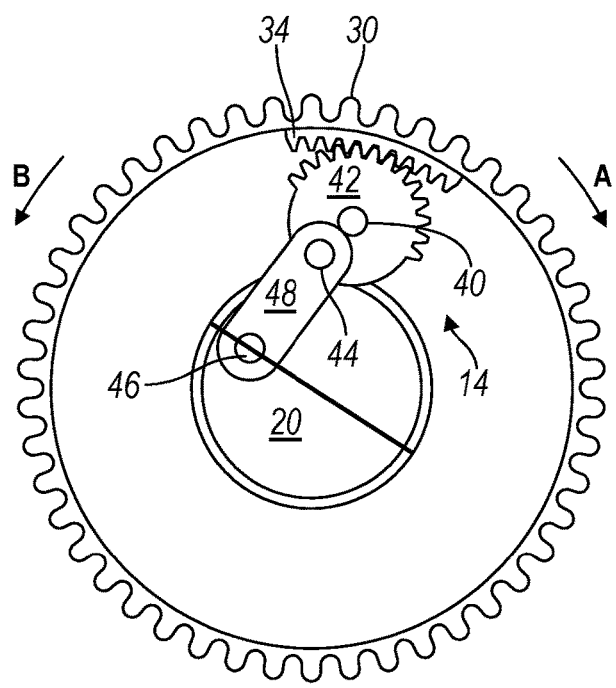
Figure 4C:
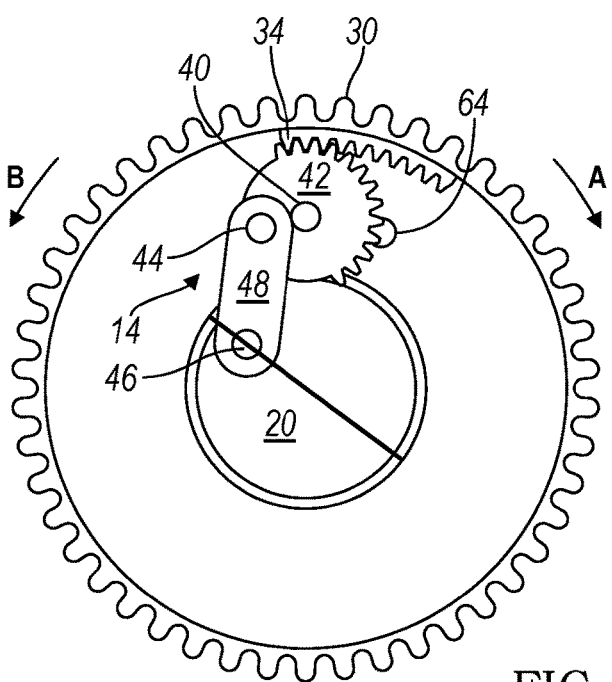

In this implementation, the planetary gear pivot 44 can extend through an arcuate slot 64 formed in the axially-facing surface 38 of the housing 24 allowing relative movement of the pivot 44 relative to the housing 24 as the rotor 24 rotates relative to the housing 24 (shown in FIGS. 4(*a*) and 4(*c*)). In this implementation, the planetary gear pivot can be a cylindrical stud that extends away from the radial surface 54 of the planetary gear 42 parallel to the axis of camshaft rotation (x). However, it should be appreciated that other implementations are possible. The location of the planetary gear pivot 44 can be positioned elsewhere and defined using polar coordinates relative to the center of planetary gear rotation about the gear shaft 40. The polar coordinates can be chosen to control the rotation of the inner concentric camshaft 20 relative to the outer concentric camshaft 18 coupled to the rotor 22. The camshaft pivot 46 can extend outwardly from an end or nose of the inner concentric camshaft 20. The camshaft pivot 46 can be configured to pivotably engage the link member 48 allowing the link member 48 to move about the camshaft pivot 46 and translate linear motion of link member 48 created by the planetary gear 42 into rotational motion of the inner concentric camshaft 20. In this implementation, the camshaft pivot 46 can be a cylindridal stud that extends away from a nose of the inner camshaft parallel to the axis of camshaft rotation (x). However, it should be understood that other implementations are possible. The location of the camshaft pivot 46 can be defined using polar coordinates relative to the center of camshaft rotation (x). The polar coordinates can be chosen to control the rotation of the inner concentric camshaft 20 relative to the outer concentric camshaft 18 coupled to the rotor 22.

The link member 48 can include a receiving portion 56 that engages the planetary gear pivot 44 and another receiving portion 58 that engages the camshaft pivot 46. In this implementation the receiving portions 56, 58 are annular apertures that extend from one longitudinal face of the link member 48 to another longitudinal face of the link member 48 and are shaped to closely conform to the planetary gear pivot 44 and the camshaft pivot 46. The cylindrical studs forming the planetary gear pivot 44 and the camshaft pivot 46 can be received by the apertures and allow the link member 48 to pivot about both the planetary gear pivot 44 and the camshaft pivot 46.

During engine operation, the crankshaft rotates and that rotation is communicated to the housing of the independent VCT device 12 through the endless loop. The independent VCT device 12 transmits that force to the inner and outer concentric camshafts 18, 20 through the rotor 22. The rotor 22 can be angularly displaced relative to the housing 24 thereby changing the angular position of the outer concentric camshaft 18 relative to the crankshaft. Pressurized fluid can be selectively directed to one side of the vane(s) 28 to move the rotor 22 relative to the housing 24 in one angular direction or directed to the other side of the vanes 28 to move the rotor 22 relative to the housing 24 in another angular direction. This angular movement can also be referred to as advancing or retarding the angular position between the camshaft(s) and the crankshaft. Or the rotor 22 can maintain its relative position relative to the housing 24 thus maintaining the phase relationship between the inner concentric camshaft 20 and the outer concentric camshaft 18. The angular movement of the rotor 22 relative to the housing 24 can be controlled based on a signal received from a camshaft sensor that detects the angular position of the camshaft. An example of a hydraulically-actuated camshaft phaser is described in U.S. Pat. No. 8,356,583 the contents of which are hereby incorporated by reference.

As the housing 24 rotates, so too do the other components of the independent VCT device 12 and the dependent VCT device 14. A valve (not shown) can control the pressurized fluid to move the rotor 22 in one angular direction, move the rotor 22 in another angular direction, or maintain the angular position of the rotor 22 relative to the housing 24. When the valve directs the rotor 22 to move relative to the housing 24, this angular movement can move the outer concentric camshaft 18 relative to the crankshaft. The movement of the rotor 22 also changes the angular position of the inner concentric camshaft 20 relative to the outer concentric camshaft 18. For example, if the rotor 22 moves to advance timing of the outer concentric camshaft 18 relative to the crankshaft, the rotor 22 can move clockwise in direction A. This is shown in FIG. 4(*a*). As the rotor 22 changes its angular position relative to the housing 24, the rotor 24 moves the planetary gear 42 relative to the ring gear 34 in a counter-clockwise direction. The rotational movement of the planetary gear 42 moves the link member 48 about the planetary gear pivot 44 and the camshaft pivot 46 thereby translating the rotational movement of the rotor 22 into corresponding rotational movement of the inner concentric camshaft 20 in a first angular direction (direction A). Conversely, moving the rotor 22 to retard timing of the outer concentric camshaft 18 relative to the crankshaft can rotate the rotor 22 counter-clockwise in direction B as shown in the change in position between FIGS. 4(*a*)-4(*b*). As the rotor 22 changes its angular position relative to the housing 24, the rotor 22 moves the planetary gear 42 relative to the ring gear 34 in a clockwise direction. The rotational movement of the planetary gear 42 moves the link member 48 about the planetary gear pivot 44 and the camshaft pivot 46 thereby translating the rotational movement of the rotor 22 into corresponding rotational movement of the inner concentric camshaft 20 in a second angular direction (direction B) through the dependent VCT device 14.

Figure 5:
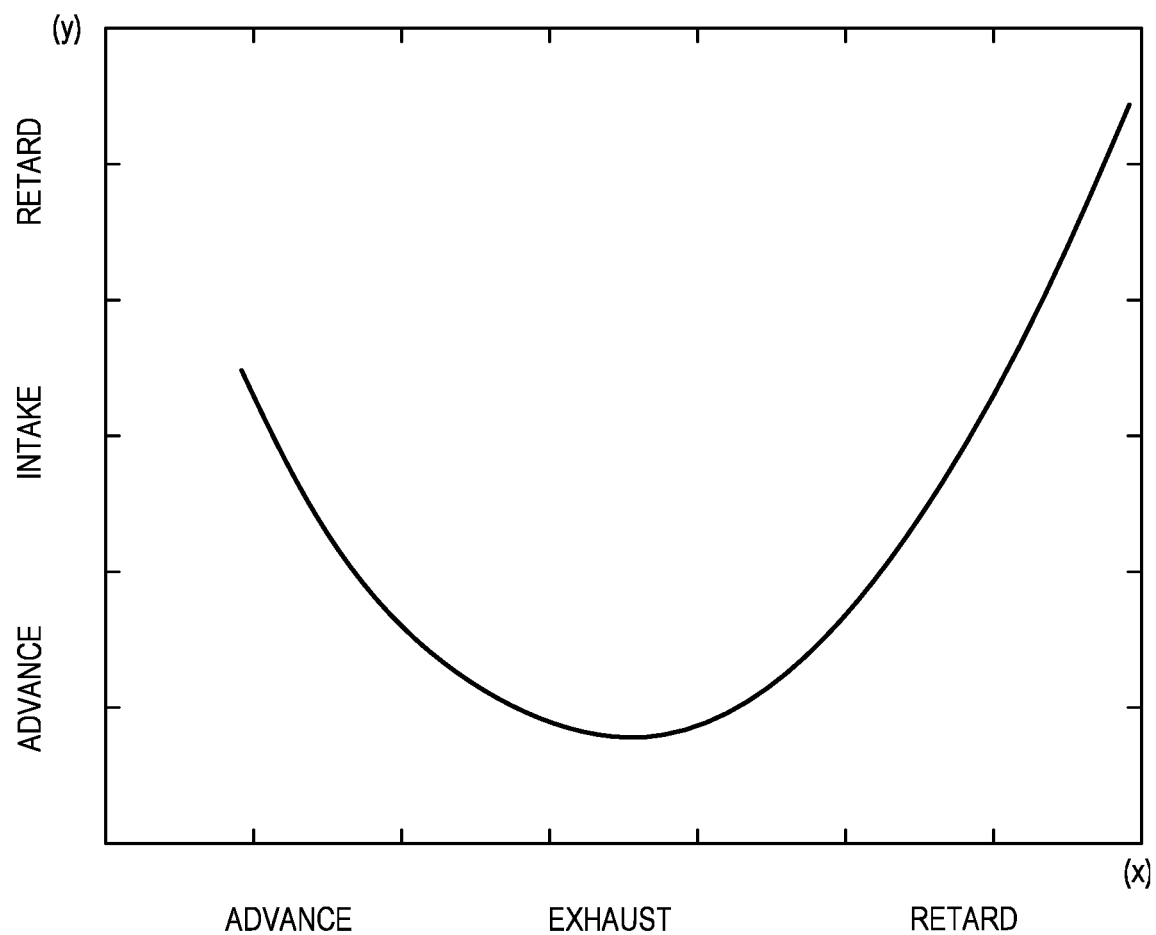
FIG. 5 is a graph depicting the change in angular position of a first concentric camshaft relative to a second concentric camshaft.
Figure 6A:
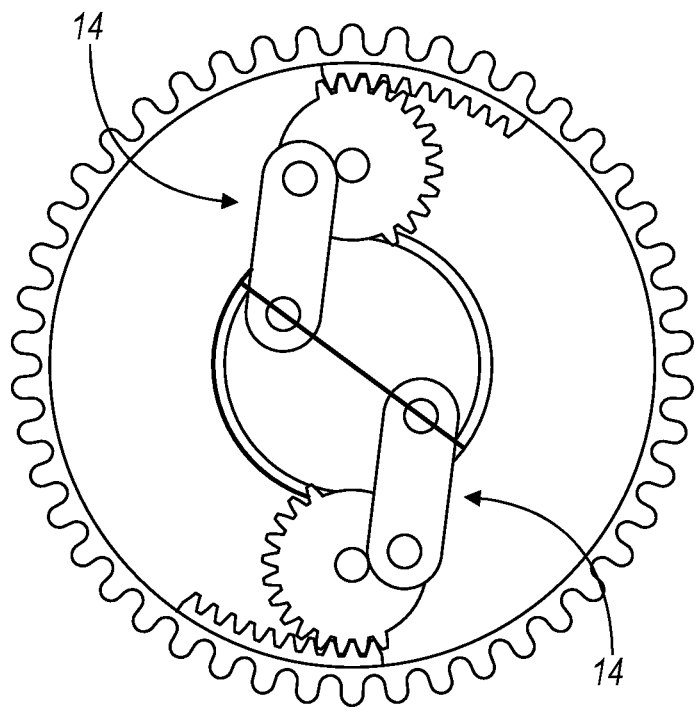
FIGS. 6(*a*)-6(*b*) are cross-sectional views depicting different implementations of VCT assemblies.
Figure 6B:
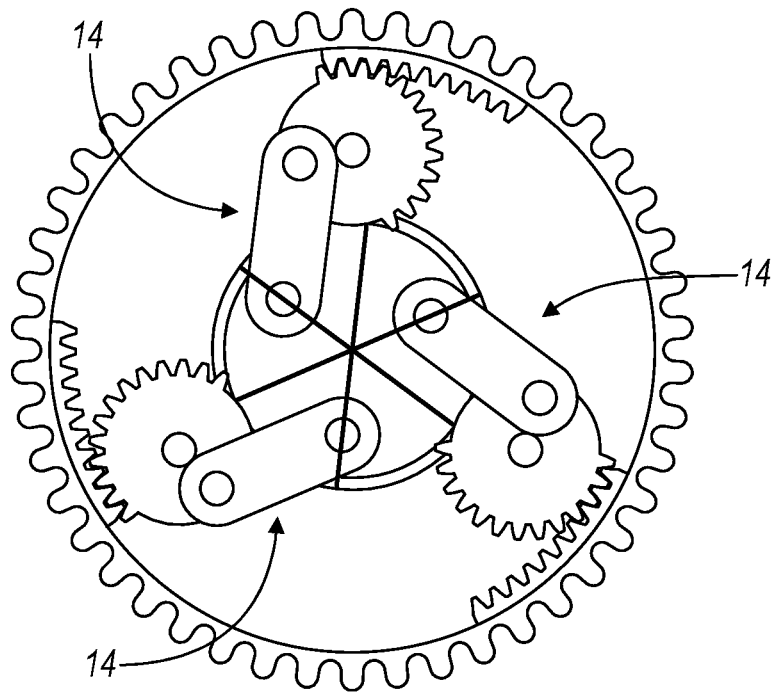

Turning to FIG. 5, a graph is shown that depicts the angular position of the outer concentric camshaft 18 and how angular movement of the outer concentric camshaft 18 relative to the crankshaft correspondingly angularly moves the inner concentric camshaft 20 relative to the crankshaft. The angular position of the inner concentric camshaft 20 is represented in degrees on the y-axis and the angular position of the outer concentric camshaft 18 is represented in degrees on the x-axis. The curve shown on the graph has a particular shape that can be created by specifying particular values for the motion variables discussed above. It is possible to change the shape of this curve by changing any one of the motion variables. For instance, if the VCT assembly includes one independent VCT device and one dependent VCT device, the shape of the curve that represents the relative motion between the outer concentric camshaft 18 and the inner concentric camshaft 20 can be changed by changing one or more of the polar coordinates of the planetary gear pivot 44 on the face of the planetary gear 42, the polar coordinates of the camshaft pivot 46, the length of the link 48, and the size of the planetary gear 42. The inclusion of a second dependent VCT device can increase the transmittable torque from the independent VCT device to the inner camshaft and balance the forces acting on the inner camshaft from the dependent VCT devices to reduce wear and other advantages. Implementations in which a VCT assembly includes one independent VCT device and a plurality of dependent VCT devices are shown in FIGS. 6(*a*)-6(*b*).

Figure 7:
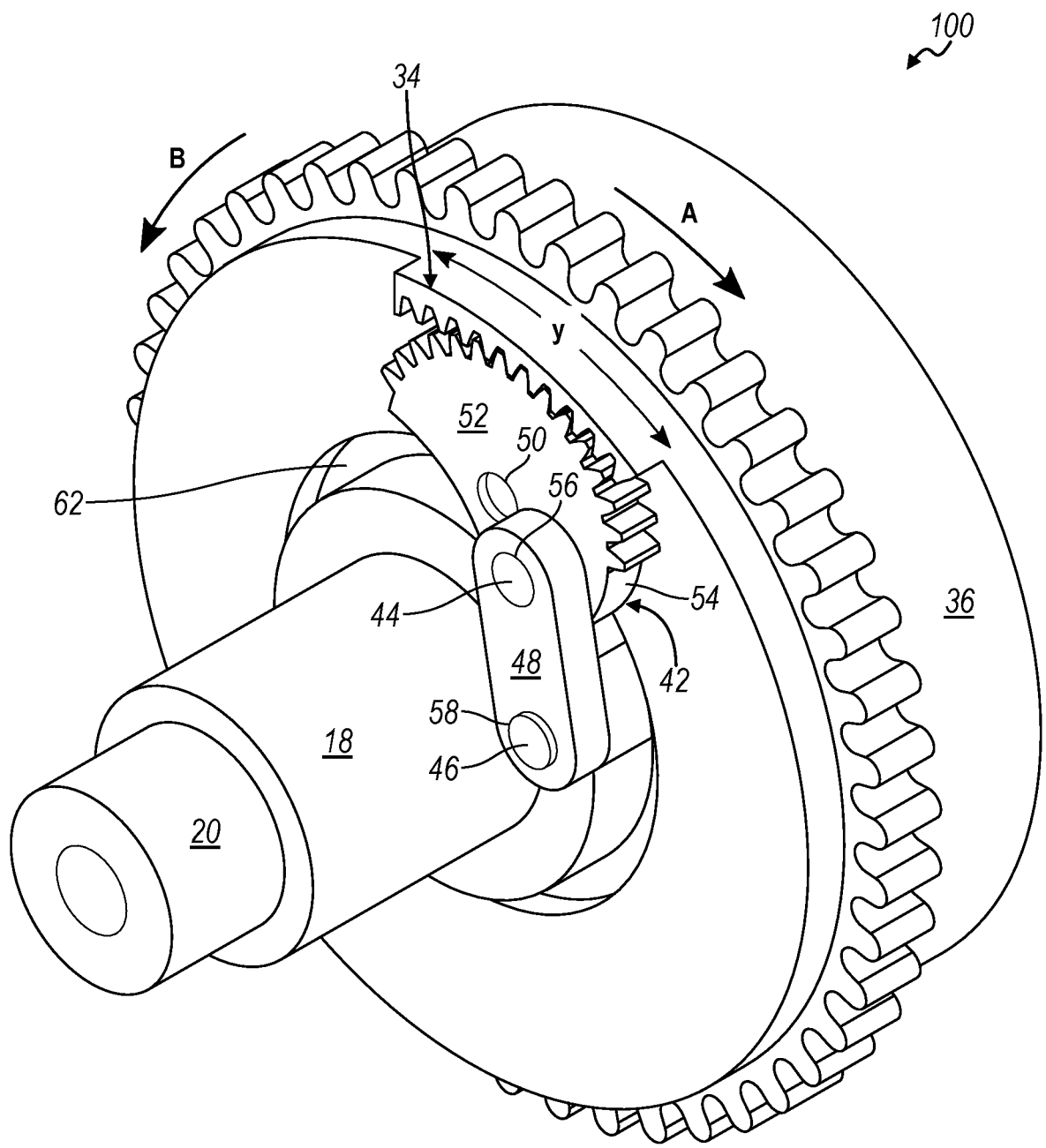
FIG. 7 is an isometric view depicting another implementation of a VCT assembly.
Figure 8:
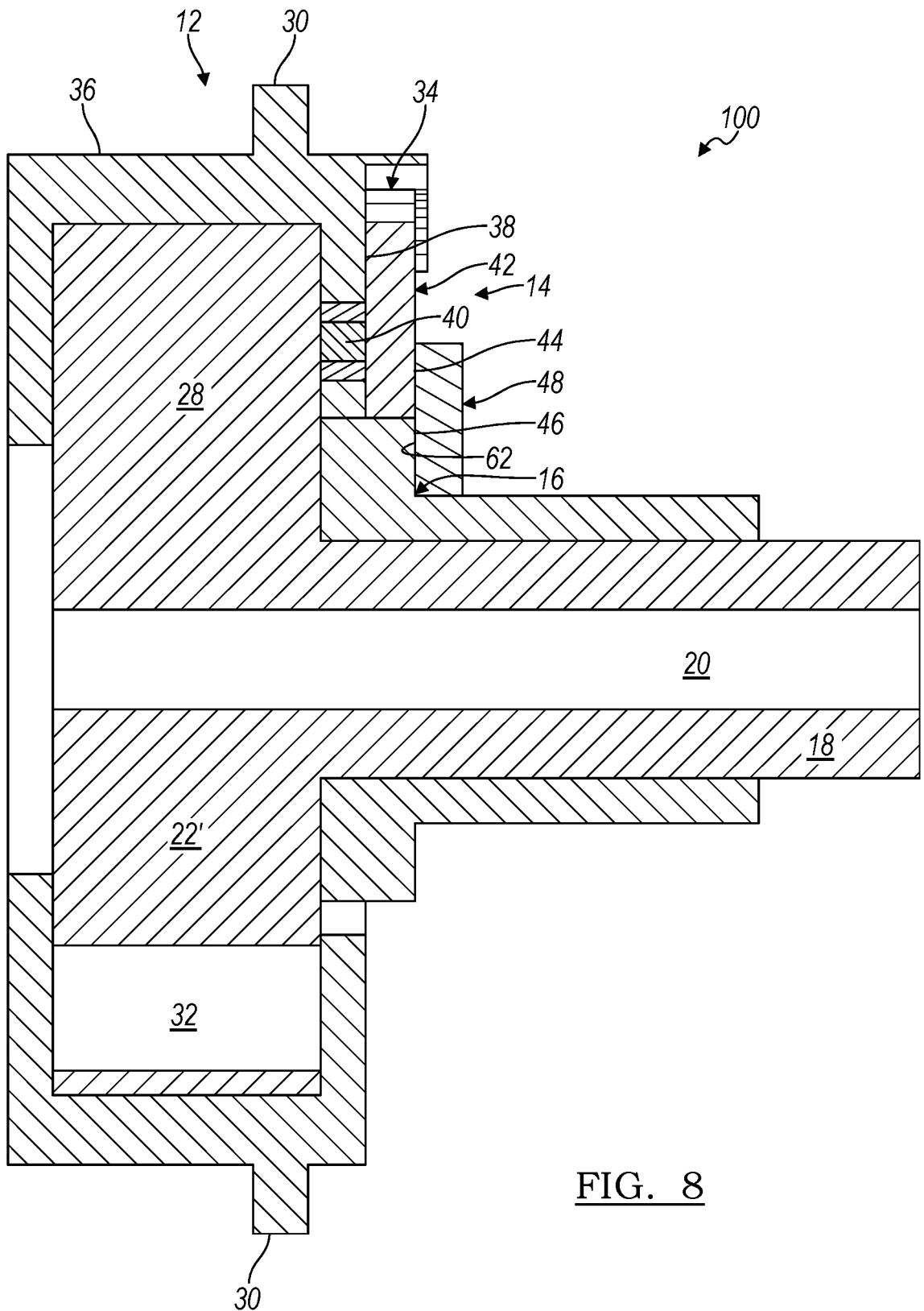
FIG. 8 is a cross-sectional view depicting another implementation of a VCT assembly.

Other implementations are possible. Turning to FIGS. 7-8, an embodiment of a VCT assembly 100 is shown in which the independent VCT device 12 is coupled with the inner concentric camshaft 20 and the dependent VCT device 14 is coupled with the outer concentric camshaft 18. The rotor 22' is rigidly coupled with the inner concentric camshaft 20 and the camshaft pivot 46 extends axially away from a shoulder portion 62 of the outer concentric camshaft 18 substantially parallel with the axis of camshaft rotation (x). When the valve directs the rotor 22' to move relative to the housing 24, this angular movement can move the inner concentric camshaft 20 relative to the crankshaft. The movement of the rotor 22' also changes the angular position of the outer concentric camshaft 18 relative to the inner concentric camshaft 20. For example, if the rotor 22' moved to retard timing of the inner concentric camshaft 20 relative to the crankshaft, the rotor 22' can move clockwise in direction A. As the rotor 22' changes its angular position relative to the housing 24, the rotor 22' moves the planetary gear 42 relative to the ring gear 34 in a counter-clockwise direction (direction B). The rotational movement of the planetary gear 42 moves the link member 48 about the planetary gear pivot 44 and the camshaft pivot 46 thereby translating the rotational movement of the rotor 22' into corresponding rotational movement of the outer concentric camshaft 18 in direction B. Conversely, moving the rotor 22' to advance timing of the inner concentric camshaft 20 relative to the crankshaft can rotate the rotor 22' counter-clockwise in direction B. As the rotor 22' changes its angular position relative to the housing 24, the rotor 22' moves the planetary gear 42 relative to the ring gear 34 in a clockwise direction (direction A). The rotational movement of the planetary gear 42 moves the link member 48 about the planetary gear pivot 44 and the camshaft pivot 46 thereby translating the rotational movement of the rotor 22' into corresponding rotational movement of the outer concentric camshaft 18 in direction A.

Figure 9:
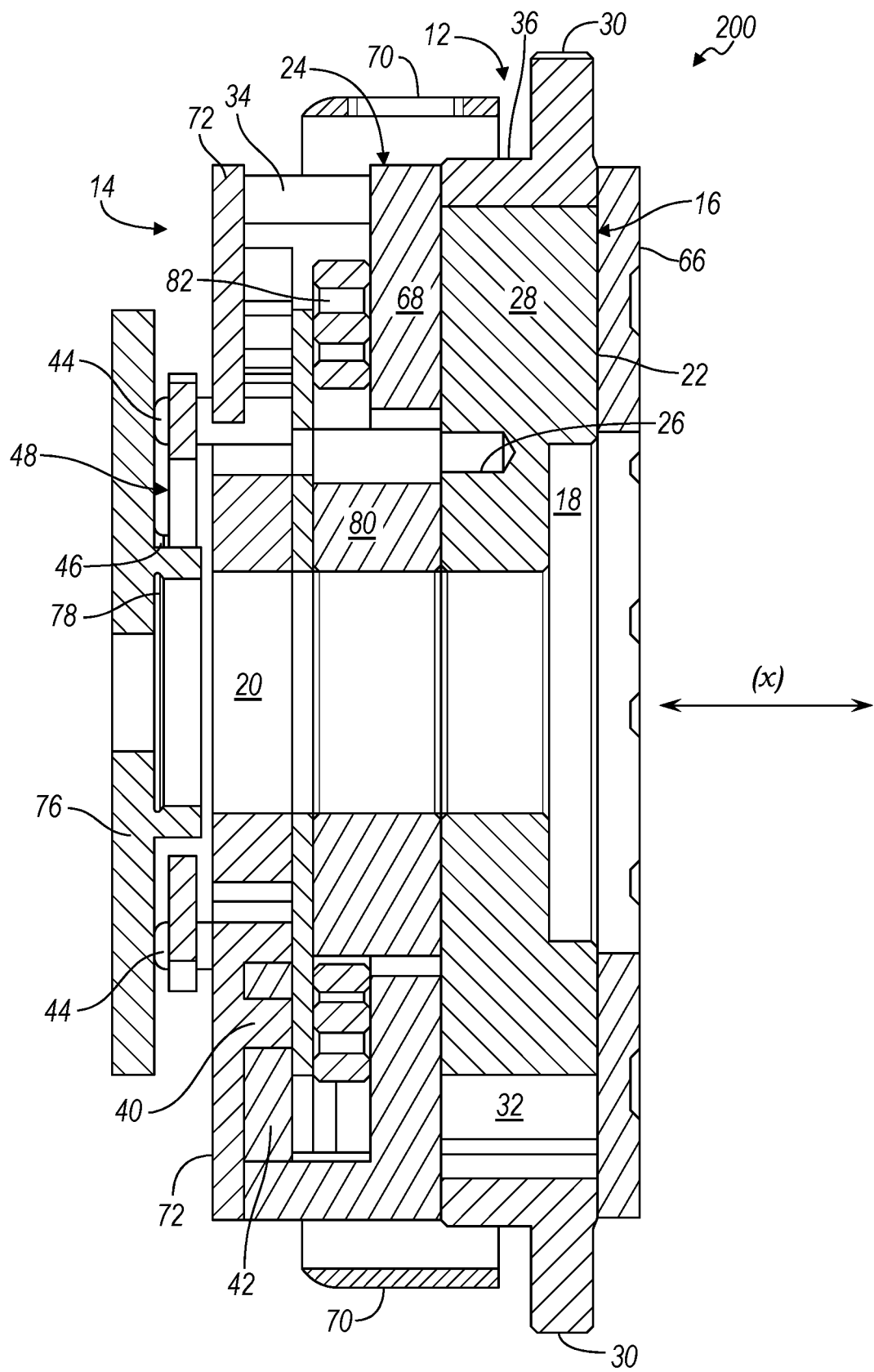
FIG. 9 is a cross-sectional view depicting another implementation of a VCT assembly.

Turning to FIG. 9, an embodiment of a VCT assembly 200 is shown in which the independent VCT device 12 is coupled with the outer concentric camshaft 18 and the dependent VCT device 14 is coupled with the inner concentric camshaft 20. The independent VCT device 12 includes the housing 24, which can have an inner plate 66, an outer plate 68, the ring gear 34, and the sprocket 30 on the radial surface 36. The rotor 22 is received by the housing 24 and couples with the outer camshaft 18. A sensor wheel 70 for determining the angular position of the outer concentric camshaft 18 and the inner concentric camshaft 20 is coupled to the rotor 22 and outer camshaft 18. The dependent VCT device 14 includes a planetary gear carrier 72 that is fixedly coupled with respect to the rotor 22 and includes the planetary gear shaft 40. The planetary gear 42 includes a planetary gear pivot 44, on the face 52 of the gear 42, that is configured to connect with the link member 48. An inner camshaft connection plate 76 can couple with a proximate end 78 of the inner concentric camshaft 20 and include a camshaft pivot 46 positioned radially-outwardly from the axis of camshaft rotation (x). The link member 48 includes planetary pivot receiving portion 56 and a camshaft pivot receiving portion 58 that pivotably connect with the planetary gear pivot 44 and the second pivot 46. In one implementation, the camshaft pivot 46 and/or the planetary gear pivot 44 can be implemented as a clevis pin, such that the pivot is a shaft having one or more radially-expanded portions that can prevent the link member 48 from moving in an axial direction along the axis of camshaft rotation (x). The rotor 22 and the planetary gear carrier 72 can be separated by and connected together via a connecting hub 80. A biasing spring 82 can be coupled with the housing 24 and the rotor 22 and positioned axially adjacent to the housing 24.

As the rotor 22 of the VCT assembly 200 changes angular position relative to the housing 24 to change the angular position of the outer concentric camshaft 18 relative to the crankshaft, the rotor 22 simultaneously rotates the planetary gear 42 relative to the ring gear 34 about the axis of camshaft rotation (x). Rotation of the rotor 22 in a clockwise direction imparts that movement through the planetary gear carrier 72 and transmits rotational motion to the link member 48. The link member 48 rotates the inner concentric camshaft 20 through the inner camshaft connection plate 76 in a clockwise or counter-clockwise direction as determined by the polar coordinates of the camshaft pivot 46 and planetary gear pivot 44, the location of the planetary gear shaft 40, the length of the link member 48, and gear pitch of both the ring gear 34 and the planetary gear 42. Rotation of the rotor 22 in a counter-clockwise direction imparts that movement through the planetary gear carrier 72 and transmits rotational motion to the link member 48. The link member 48 rotates the inner concentric camshaft 20 through the inner camshaft connection plate 76. The sensor wheel 70 can be a single sensor wheel that is used to determine the angular position of both the outer concentric camshaft 18 and the inner concentric camshaft 20. Given the precise and predictable mechanical relationship between the rotational movement of the dependent VCT device 14 relative to the rotational motion imparted on it by the output of the independent VCT device 12, the angular position of both camshafts 18, 20 can be resolved using one signal received from a single camshaft sensor wheel.

Figure 10A:
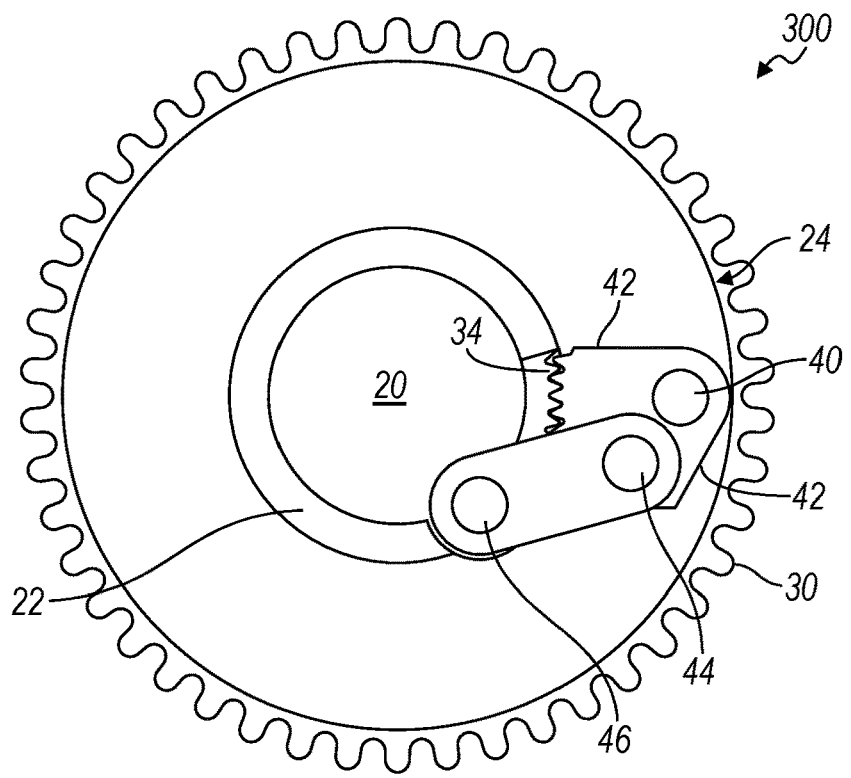
FIGS. 10(*a*)-10(*b*) are cross-sectional views depicting another implementation of a VCT assembly.
Figure 10B:
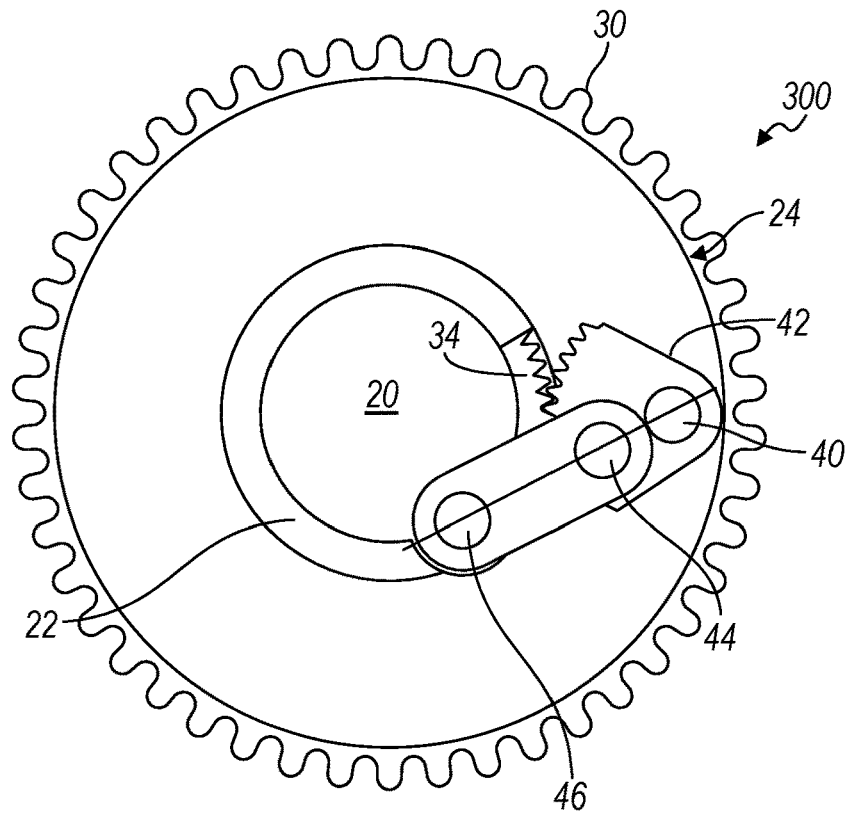

Other implementations of the VCT assembly are possible. Turning to FIGS. 10(a)-10(b), a VCT assembly 300 includes an independent VCT device 12 and a dependent VCT device 14. In this implementation, the housing 24 of the independent VCT device 12 includes the planetary gear shaft 40 that carries the planetary gear 42. And the ring gear 34 is coupled with the rotor 22. In this implementation, the planetary gear 42 is positioned so that its gear teeth extend towards the camshaft center axis and the ring gear 34 includes gear teeth that extend radially-outwardly such that the gear teeth of the planetary gear 42 and the ring gear 34 engage each other. The planetary gear 42 includes a planetary gear pivot 44 and the inner concentric camshaft 20 includes the camshaft pivot 46. The link member 48 pivotably couples the planetary gear 42 to the inner concentric camshaft 20 as describes above. In this implementation, the planetary gear shaft 40 does not extend from a location on the rotor 22 through an opening in the housing, such as an arcuate slot, thereby simplifying construction in electrically or hydraulically-actuated VCT devices, and eliminating a leak path for this opening when used in implementation having a hydraulically-actuated independent VCT device. As the rotor 22 changes its angular position relative to the housing 24, the planetary gear 42 moves relative to the ring gear 34 and pivots about the planetary gear shaft 40. The movement of the planetary gear 42 correspondingly moves the link member 48, which translates the linear motion into rotational motion of the inner concentric camshaft 20.

Further, in some implementations, the rotational direction of the camshaft relative to the crankshaft adjusted by the output of the independent VCT device 12 can remain constant while the rotational direction of the camshaft relative to the crankshaft adjusted by the dependent VCT device 14 can change. As the output of the independent angular device 12 moves in one angular direction, the angular direction of the camshaft controlled by the dependent VCT device 14 can move in the same angular direction but reach an inflection point at which even though the output continues to move in the same angular direction the camshaft controlled by the dependent VCT device 14 stops moving in that angular direction and begins moving in an opposite angular direction. An implementation in which this motion is possible is shown in FIGS. 10(a)-10(b). FIG. 10(a) depicts an output of the independent VCT device 12 coupled with the outer concentric camshaft 18 and the dependent VCT device 14 coupled with the inner concentric camshaft 20. The ring gear 34 is coupled with the rotor 22 and includes a ring gear 34 that has radially-outwardly extending gear teeth that are configured to engage with the gear teeth of the planetary gear 42. FIG. 10(a) depicts the rotor 22 at a first angular position relative to the housing 24 and the planetary gear 42. And FIG. 10(b) depicts the rotor 22 moved in a counter-clockwise direction to a second angular position. During the movement of the rotor 22 from the first angular position to the second angular position, the outer concentric camshaft 18 moved in a counter-clockwise direction and the inner concentric camshaft 20 moved in a clockwise direction. At the second angular position, the inner concentric camshaft 20 stops moving in the clockwise direction and if the rotor continues moving in the counter-clockwise direction beyond the second angular position, the inner concentric camshaft 20 begins moving in a counter-clockwise direction. The change in angular direction of the inner concentric camshaft 20 relative to the outer concentric camshaft 18, also referred to as an inflection point, can occur when the planetary gear shaft 40, the planetary gear pivot 44, and the camshaft pivot 46 are linearly aligned as is shown in FIG. 10(b).

Also, it should be appreciated that a VCT assembly can implement the independent VCT device as an electrically-actuated VCT device, such as an electrically-actuated camshaft phaser. The independent VCT device can be implemented using an electrically-actuated camshaft phaser having a planetary gearbox. Examples of this include a camshaft phaser having a planetary gear carrier having a plurality of planetary gears that engage two ring gears each having different numbers of gear teeth. One ring gear is coupled with an input of the camshaft phaser and another ring gear is coupled with an output of the camshaft phaser. A sun gear engages the planet gears and can rotate the planet gears relative to the ring gears thereby angularly displacing the input relative to the output. The planetary gear of the dependent VCT device can be carried by the output of the electrically-actuated camshaft phaser such that rotational movement of the output is communicated through the planetary gear and link member to the concentric camshaft not directly coupled with the output of the electrically-actuated camshaft phaser. Implementations of electrically-actuated camshaft phasers can be found in U.S. Patent Application Publication No. 2017/0248045 and U.S. patent application Ser. No. 16/155,125 the contents of which are incorporated by reference.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A variable camshaft timing (VCT) assembly for controlling an angular position of camshafts, comprising:
   a hydraulically-actuated or electrically-actuated camshaft phaser that has an output, comprising a rotor having vanes or a mechanical gearbox, configured to couple with a first camshaft and change an angular position of the first camshaft relative to an angular position of a crankshaft; and
   a link including a first pivot and a second pivot that mechanically link the output of the camshaft phaser with a second camshaft that is concentric to the first camshaft, wherein movement of the link about the first pivot or the second pivot changes an angular position of the second camshaft relative to the angular position of the first camshaft based on angular movement of the output of the camshaft phaser, wherein the pivot is offset from an axis of camshaft rotation.

2. The VCT assembly recited in claim 1, wherein an independent VCT phaser is hydraulically-actuated.

3. The VCT assembly recited in claim 1, further comprising a planetary gear carried by the output of the camshaft phaser, the first pivot or the second pivot positioned on a face of the planetary gear, the other of the first pivot or the second pivot attached to the second camshaft, and the link pivotably connects the first pivot and the second pivot.

4. The VCT assembly recited in claim 3, wherein the planetary gear, the first pivot or the second pivot on the face of the planetary gear, and the other of the first pivot or the second pivot attached to the second camshaft are separated from the first camshaft by the output of the camshaft phaser.

5. The VCT assembly recited in claim 1, further comprising a plurality of planetary gears each carried by the output of the camshaft phaser.

6. The VCT assembly recited in claim 1, further comprising a camshaft sprocket that is configured to engage an endless loop that communicates rotational force from the crankshaft to the camshaft phaser.

7. The VCT assembly recited in claim 1, wherein the first camshaft is positioned radially outwardly relative to the second camshaft.

8. The VCT assembly recited in claim 1, wherein the first camshaft is positioned radially inwardly relative to the second camshaft.

9. The VCT assembly recited in claim 1, wherein a rotational direction of the first camshaft relative to the crankshaft adjusted by the output of the camshaft phaser remains constant while a rotational direction of the second camshaft relative to the crankshaft changes.

10. The VCT assembly recited in claim 1, further comprising a sensor wheel.

11. A variable camshaft timing (VCT) assembly for controlling an angular position of camshafts, comprising:

a hydraulically-actuated or electrically-actuated camshaft phaser having an output that is configured to couple with a first concentric camshaft and change an angular position of the first concentric camshaft relative to an angular position of a crankshaft;

a planetary gear that rotates about a planetary gear shaft and engages a ring gear coupled with the housing;

a camshaft pivot coupled with the first concentric camshaft or the output of the camshaft phaser;

a planetary gear pivot coupled to the planetary gear, wherein the planetary gear pivot is spaced apart from the planetary gear shaft; and a link that movably couples the planetary gear pivot and the camshaft pivot, wherein the planetary gear, the camshaft pivot, and the link change an angular position of a second concentric camshaft relative to the angular position of the first concentric camshaft based on angular movement of the output of the camshaft phaser.

12. The VCT assembly recited in claim 11, wherein the camshaft phaser is hydraulically-actuated and the output includes a rotor, having one or more vanes extending radially outwardly from a hub.

13. A variable camshaft timing (VCT) assembly for controlling an angular position of camshafts, comprising:

a hydraulically-actuated or electrically-actuated camshaft phaser having an output that is configured to couple with a first camshaft and change an angular position of the first camshaft relative to an angular position of a crankshaft; and a planetary gear carried by the output of the camshaft phaser, a pivot on a face of the planetary gear, a pivot attached to a second camshaft, and a link that pivotably connects the pivot on the face of the planetary gear and the pivot attached to the second camshaft.

* * * * *